(12) United States Patent
Tokiwa

(10) Patent No.: US 6,343,549 B1
(45) Date of Patent: Feb. 5, 2002

(54) NETWORK-TYPE SYNCHRONOUS CONTROL SYSTEM FOR ROTARY PRINTING PRESSES

(75) Inventor: Shizurou Tokiwa, Zushi (JP)

(73) Assignee: Tokyo Kikai Seisakusho, Ltd. (JP)

( * ) Notice: Subject to any disclaimer, the term of this patent is extended or adjusted under 35 U.S.C. 154(b) by 0 days.

(21) Appl. No.: 09/639,724

(22) Filed: Aug. 16, 2000

(30) Foreign Application Priority Data

Aug. 30, 1999 (JP) ............................................ 11-242431

(51) Int. Cl.⁷ ................................................ B41F 13/24
(52) U.S. Cl. ....................... 101/248; 101/181; 101/216; 700/3; 318/85
(58) Field of Search ................................. 101/248, 216, 101/219, 221, 181, 485; 318/615, 625, 611, 640, 671, 85; 700/8, 122

(56) References Cited

U.S. PATENT DOCUMENTS

| 4,761,597 A | * | 8/1988 | Sasaki et al. | ............... 318/625 |
| 4,839,814 A | * | 6/1989 | Steidel | ........................ 101/248 |
| 4,898,094 A | * | 2/1990 | Doumoto et al. | ........... 101/485 |
| 5,049,798 A | * | 9/1991 | Jackson | ....................... 318/640 |
| 5,309,834 A | * | 5/1994 | Koch | ........................... 101/248 |
| 5,415,093 A | * | 5/1995 | Numauchi | ................... 101/248 |
| 5,787,806 A | * | 8/1998 | Seyfried | ...................... 101/181 |
| 5,947,023 A | * | 9/1999 | Bohre et al. | ................. 101/181 |
| 5,988,846 A | * | 11/1999 | Flamm et al. | ................. 700/8 |

FOREIGN PATENT DOCUMENTS

JP          6-47905          2/1994

* cited by examiner

Primary Examiner—Eugene Eickholt
(74) Attorney, Agent, or Firm—McGlew and Tuttle, P.C.

(57) ABSTRACT

A network-type synchronous control system for rotary printing presses in which a driving means of a printing section P and the driven part thereof are combined into a block, and control is exercised so that several sets are brought into synchronous rotation by each set, the improvement comprising master control sections 1 and 2 that can independently control each of sets formed from arbitrary combinations of blocks, slave control sections 3 for controlling each block in the set upon receipt of control information from the master control sections 1 and 2, and a network line 5 connecting the master control sections 1 and 2 to each of the slave control sections 3: the master control sections 1 and 2 having a processing section, an input operation section for entering information, a master value setting section for setting a master phase and a master speed and a master network connecting section; so as to have a high degree of flexibility to ensure flexible response to the circumstances.

3 Claims, 6 Drawing Sheets

FIG. 6

| S T X | P | M C 1 | V 8 | V 7 | V 6 | V 5 | V 4 | V 3 | V 2 | V 1 | E T X | B C C |

FIG. 7

| S T X | P | M C 2 | V 8 | V 7 | V 6 | V 5 | V 4 | V 3 | V 2 | V 1 | E X T | B C C |

NETWORK-TYPE SYNCHRONOUS CONTROL SYSTEM FOR ROTARY PRINTING PRESSES

BACKGROUND OF THE INVENTION

1. Field of the Invention

The present invention relates generally to a rotary printing press, and more particularly to a network-type synchronous system for rotary printing presses where a driving means of a printing section and the driven parts thereof are combined into a block, a plurality of which are combined into a set, and control is exercised to cause each of several sets to make synchronous rotation.

2. Description of the Prior Art

A synchronous control system for rotary printing presses of a conventional type in which the rotary printing press is operated by synchronously operating a plurality of driving means is known by Japanese Published, Unexamined Patent Application No. Hei-6(1994)-47905, for example.

Disclosed in Japanese Published, Unexamined Patent Application No. Hei-6(1994)-47905 is a synchronous control system for rotary printing presses in which a group of printing stations (printing units), each formed by connecting a plurality of discrete driving sections to drive control devices via a high-speed buss system, are connected via at least a data bus to a folding unit for determining a positional reference for the printing stations, and a master system that is a control/data processing unit for exercising control of target values among the printing station groups and to the folding unit, that is, a synchronous control system for rotary printing presses that is separated into a higher-order master system and a plurality of autonomous printing station groups, as disclosed in the 33 lines of the 6th column of Published, Unexamined Patent Application No. Hei-6 (1994)-47905.

In other words, the aforementioned conventional type of synchronous control system for rotary printing presses has a set configuration in which each printing station group is placed under a positional reference determined by an appropriate folding unit, so that control of printing station group target values is exercised among the printing station groups and to the folding unit via a single master system.

Having a fixed set configuration in which each printing station group is placed under a positional reference determined by an appropriate folding unit, however, the aforementioned conventional type of synchronous control system for rotary printing presses cannot change the set configuration to cope with an increase in pages of printed matter, or a breakdown in an individual printing station, leading to a failure in printing operation. Furthermore, the conventional type of synchronous control system for rotary printing presses, which is designed to exercise control of target values for printing station groups via a single master system, could not exert the target-value control among printing station groups if the higher-order master system fails. This could also lead to a failure in printing operation.

SUMMARY OF THE INVENTION

It is an object of the present invention to provide a network-type synchronous control system for rotary printing presses with such a high degree of flexibility as to ensure a flexible response to the circumstances by making it possible for the rotary press to continue printing to cope with an increase in pages of printed matter or a breakdown of an individual printing station by changing the set configuration of the rotary press and carry out the synchronous control of each driving means, or in a failure of a master control section by using another master control section.

It is another object of the present invention to provide a master value setting section for setting a master phase and a master speed for synchronous control of each set.

It is still another object of the present invention to provide a slave control section suitable for synchronous control of a printing unit driving means.

It is a further object of the present invention to provide a loop-shaped network line that can offer a detour in a failure of part of the network line.

It is still a further object of the present invention to provide a control message and the message configuration thereof for designating the control range of rotary press sets organized by a processing section and a control message and the message configuration thereof of master information values, such as a master phase and a master speed, for carrying out the synchronous control of each set.

It is still a further object of the present invention to provide the message configuration of a response message of a slave control section replying the response message.

In disclosed embodiments, the network-type synchronous control system for rotary printing presses in which driving means and the driven parts thereof of a printing section P are combined into a block, and a plurality of blocks combined into a set; several sets being controlled so that each set is caused to rotate in synchronism with each other, comprises a master control sections 1 and 2 that can individually control each of the sets organized in arbitrary combinations, slave control sections 3 for controlling each block in the set by receiving control information from the master control sections 1 and 2, and a network line 5 for connecting the master control sections 1 and 2 to each of the slave control sections 3; the master control sections 1 and 2 comprising a processing section, an input operation section for entering information, a master value setting section for setting a master phase and a master speed, and a master network connecting section.

BRIEF DESCRIPTION OF THE DRAWINGS

FIG. 6 is a diagram illustrating a control message transmitted by a master control section.

FIG. 7 is a diagram illustrating a control message transmitted by another master control section.

DETAILED DESCRIPTION OF PREFERRED EMBODIMENTS

Figure 1:
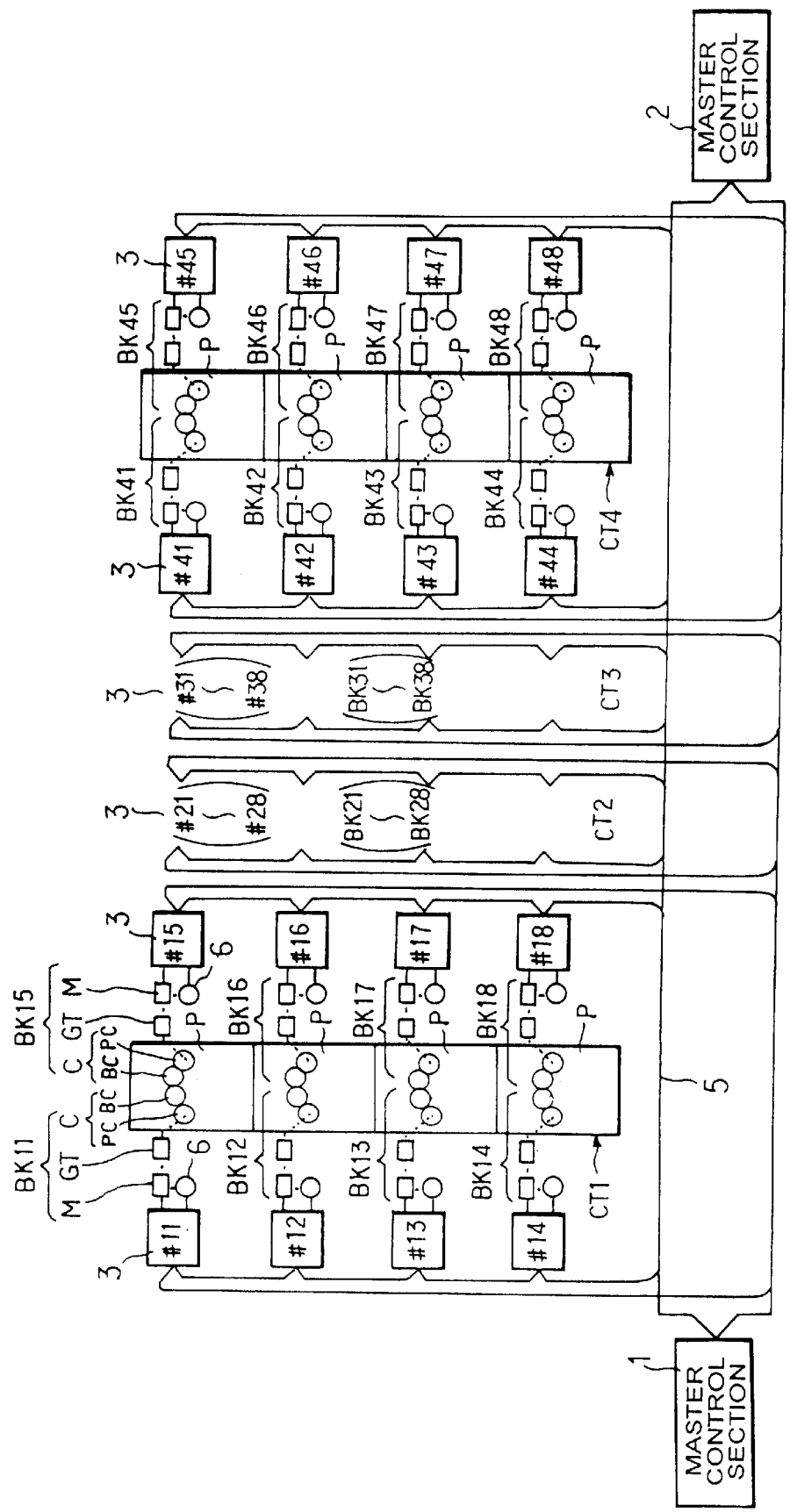
FIG. 1 is a block diagram of a network-type synchronous control system for rotary printing presses embodying the present invention.

FIG. 1 is a block diagram of a network-type synchronous control system for rotary printing presses embodying the present invention.

In FIG. 1, a rotary press comprising printing units CT1, CT2, CT3 and CT4 each having four printing sections P, and two master control sections 1 and 2. In each printing section P in the printing units CT1, CT2, CT3 and CT4 (the internal configuration of the printing units CT2 and CT3, which is the same as that of the printing unit CT1, has been omitted in the figure), two sets of printing couples C each comprising a blanket cylinder BC and a plate cylinder PC are provided.

Each printing couple C forms a driven part driven by a driving means M, such as a motor, with the plate cylinder PC driven via a transmission means GT, and the blanket cylinder BC via a transmission means (not shown) provided between the plate cylinder PC and the blanket cylinder BC. The driving means M and the driven part, such as the printing couple C driven by the driving means M form a block BK. That is, the rotary press shown in FIG. 1 is formed by blocks BK11 through BK48.

There can be a construction where the output shaft of the driving means M drives directly the plate cylinder PC by omitting the transmission means provided between the driving means M and the plate cylinder PC. #11~#18, #21~#28, #31~#38, and #41~#49 of slave control sections 3 and Z-phase encoders (hereinafter referred to as encoders for short) 6 are provided corresponding to each driving means M. Each slave control section 3 is connected to a network line 5 via a built-in slave network connecting section 31, which will be described alter, referring to FIG. 3. Two master control sections 1 and 2 are connected to the network line 5.

Furthermore, the network line 5 is formed into a loop shape so that should any one of the network line 5 fail, signal communication between the master control sections 1 and 2 and #11~#18, #21~#28, #31~#38, and #41~#48 of the slave control sections 3 can be maintained via the other of the network line 5.

Figure 2:
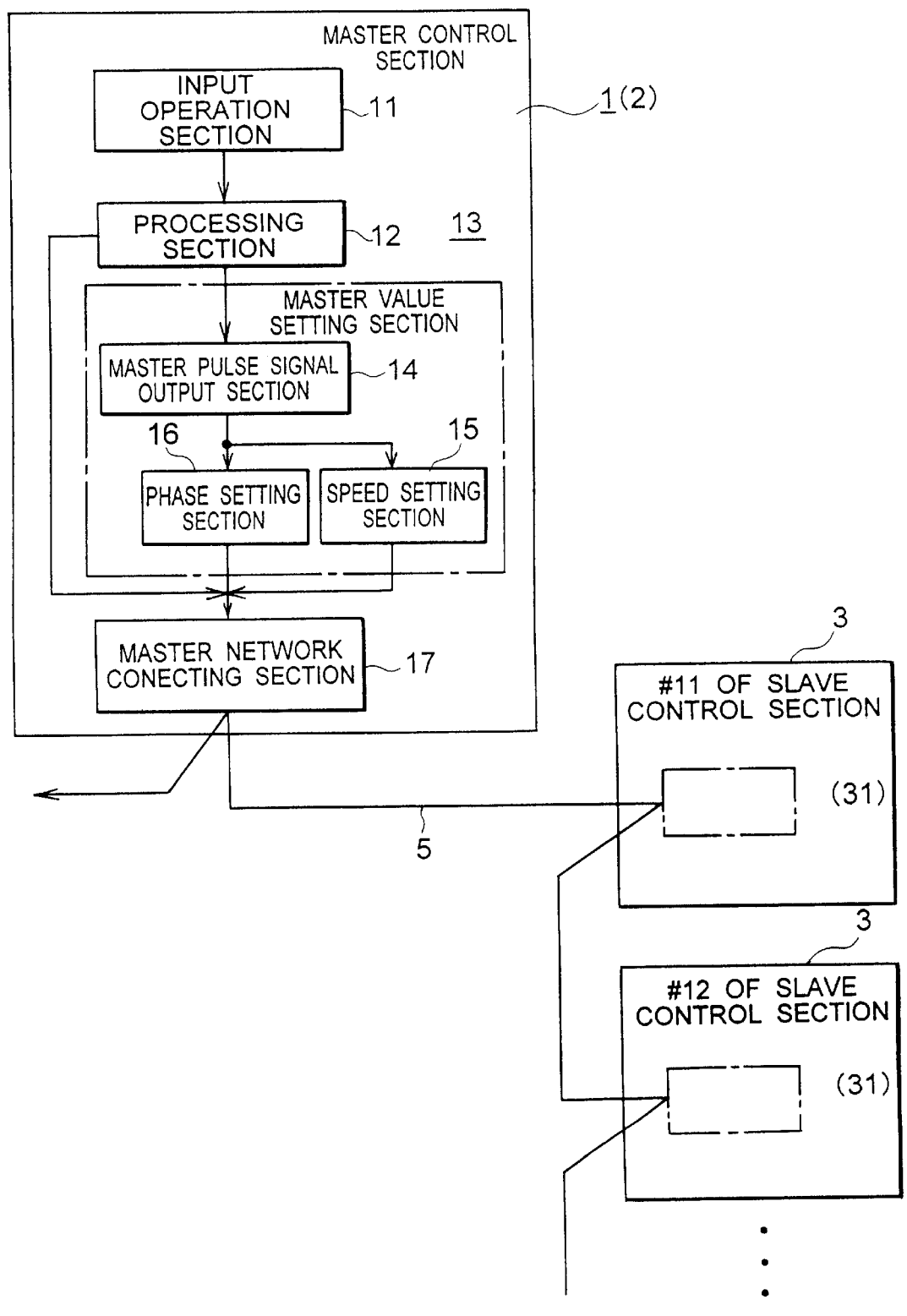
FIG. 2 is a lock diagram of an example of the master control section.

FIG. 2 is a block diagram showing an example of the master control section.

In the figure, each of the master control sections 1 and 2 has an input operation section 11, a master value setting section 13, a processing section 12, and a master network connecting section 17.

The input operation section 11 is capable of performing initial operations to enter set organization information, such as the designation of the number of pages of printed matter or the printing section P to be used, and of entering operation signals, such as start, acceleration/deceleration and stop.

The master value setting section 13 sets master values needed to control the driving means M, and the processing section 12 prepares a control range designating message by organizing rotary press sets on the basis of the set organization information entered by the input operation section 11, and causes the input operation section 11 and the master value setting section 13 to be selectively changeable in accordance with the organized rotary press sets so that the organized sets can be individually controlled in synchronism with each other. This makes it possible to individually operate each set and set master values for each set.

The master network connecting section 17 transmits the control range designating message prepared by the processing section 12 and the master value information set by the master value setting section 13 in the form of control messages, and receives the response information sent to the network line 5 by the slave control section 3, which will be described later, referring to FIG. 3.

The master value setting section 13 has a master pulse signal output section 14, a speed setting section 15, and a phase setting section 16. The master pulse signal output section 14 generates a first master pulse signal proportional to the speed value set by the processing section 12 on the basis of the operation signals, such as start, acceleration/deceleration and stop, entered by the input operation section 11, and also generates a second master pulse signal every time the first master pulse signal is generated by a predetermined number.

The speed setting section 15 sets a master speed value for the driving means M on the basis of the first master pulse signal generated by the master pulse signal output section 14.

The phase setting section 16 sets a master phase value for the driven part to be driven by the driving means M on the basis of the first and second master pulse signals generated by the master pulse signal output section 14.

Figure 3:
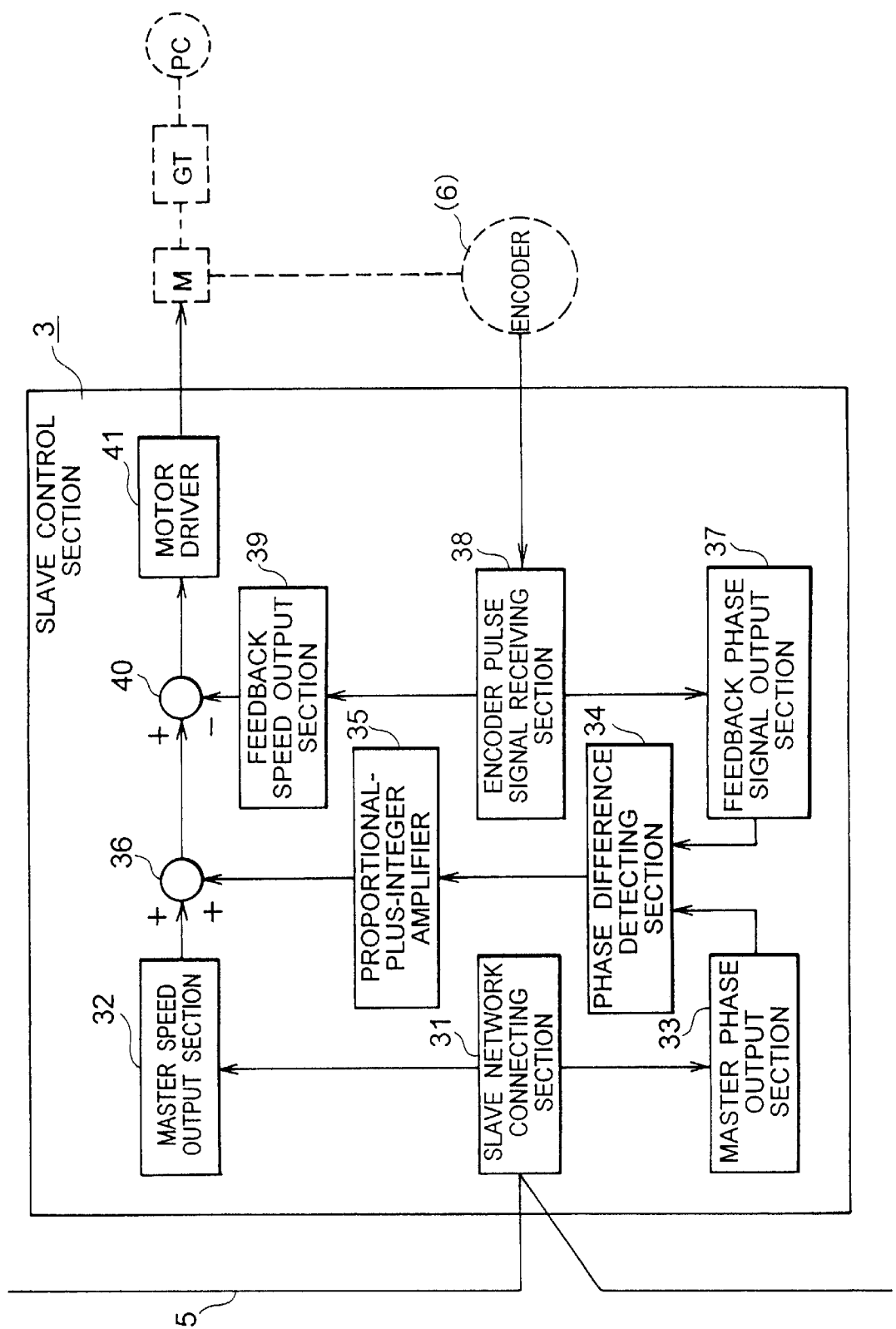
FIG. 3 is a block diagram of an example of the slave control section.

FIG. 3 is a block diagram showing an example of the slave control section.

In the figure, the slave control section 3 has a slave network connecting section 31, a master speed output section 32, master phase output section 33, an encoder pulse signal receiving section 38, a feedback speed output section 39, a feedback phase output section 37, a phase difference detecting section 34, a proportional-plus-integer amplifier 35, a first speed signal correcting section 36, a second speed signal correcting section 40, and a motor driver 41.

The slave network connecting section 31 receives a control range designating message comprising the set organization information sent by the master control sections 1 and 2 and a control message comprising master information values that are a master speed value and a master phase value via the network line 5, and transmits the response messages thereof as necessary.

The master speed output section 32 converts a master speed value in the control message received by the slave network connecting section 31 into a master speed signal that is an analog signal proportional to the speed value entered by the input operation section 11 and set by the processing section 12, and outputs it.

The master phase output section 33 receives a master phase value in the control message, and outputs it. The encoder pulse signal receiving section 38 receives the pulse signal generated by the encoder 6 corresponding to the driving means M. The feedback speed output section 37 detects a rotating phase of the driven part (the plate cylinder PC, for example) from the pulse signal produced by the encoder 6, and outputs it. The phase difference detecting section 34 calculates the difference between the master phase value produced by the master phase output section 33 and the phase value of the driven part produced by the feedback phase output section 37. The proportional-plus-integer amplifier 35 converts the difference value detected by the phase difference detecting section 34 into an analog phase difference signal, and outputs it.

The first speed signal correcting section 36 corrects the master speed output produced by the master speed output section 32 with the phase difference signal generated by the proportional-plus-integer amplifier 35. The second speed signal correcting section 40 corrects the first corrected speed signal corrected by the first speed signal correcting section 36 with the drive speed signal of the driving means M produced by the feedback speed output section 39.

The motor driver 41 supplies a drive power to the driving means M on the basis of the second corrected speed signal corrected by the second speed correcting section 40.

In the following, the operation of the network-type synchronous control system for rotary printing presses will be described.

Prior to the printing operation of the rotary press, set organization information for rotary presses to be controlled by the master control section 1 or 2 is entered by the input operation section 11 of the master control sections 1 and 2.

The set organization information for the synchronous control by the master control section 1 of the printing units CT1 and CT2 as a first set among the rotary presses shown in FIG. 1, for example, is entered into the master control section 1, and the set organization information for the synchronous control by the master control section 2 of the printing units CT3 and CT4 as a second set among the rotary presses shown in FIG. 1 is entered into the master control section 2.

With these inputs, the processing section 12 each of the master control sections 1 and 2 transmits a control range designating message consisting of ASCII codes to #11~#18, #21~#28, #31~#38, and #41~#48 of slave control sections 3 via the master network connecting section 17 and the network line 5.

Figure 4:
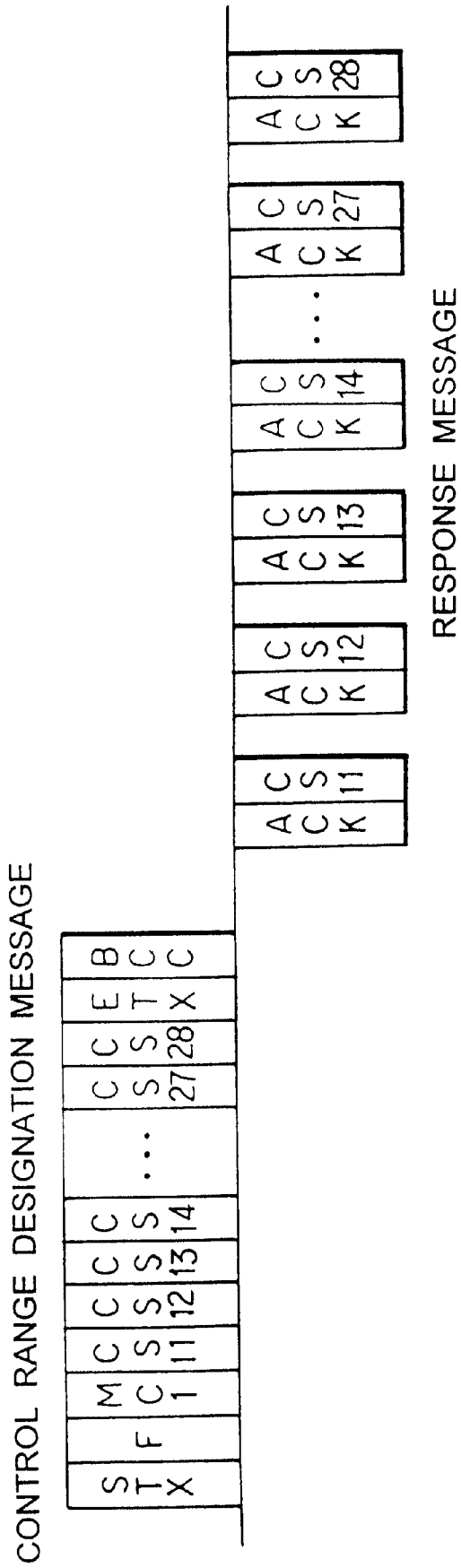
FIG. 4 is a diagram illustrating a control range designating message transmitted by a master control section and the response message thereof.
Figure 5:
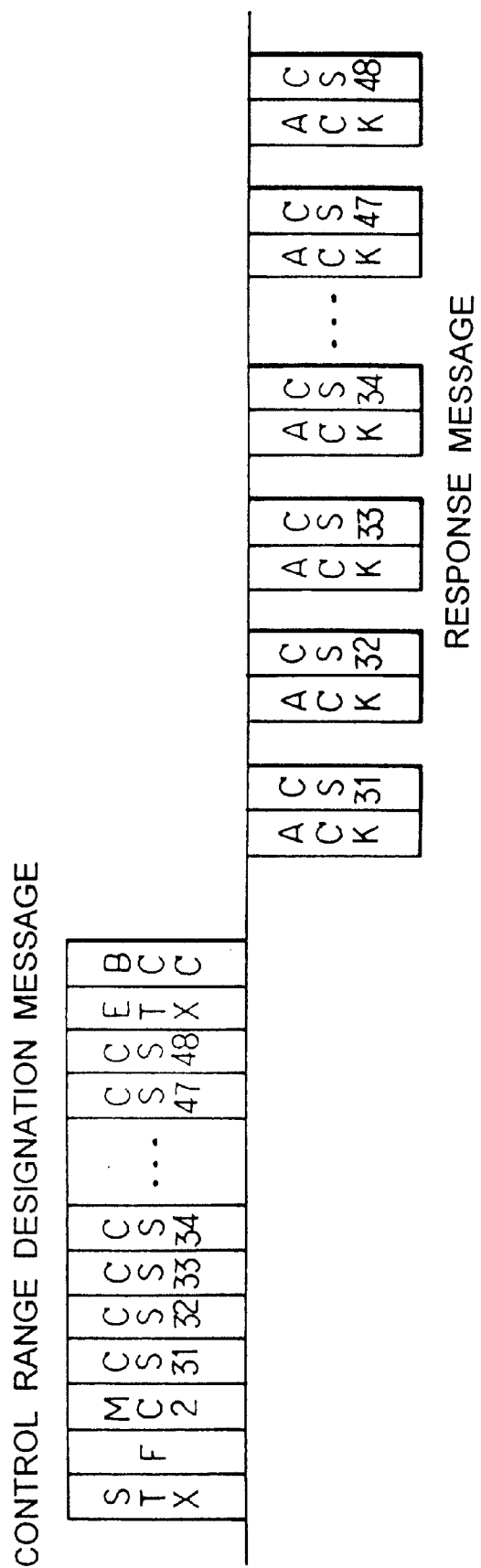
FIG. 5 is a diagram illustrating a control range designating message transmitted by another master control section and the response message thereof.

The control range designating message comprises a text sentence having a control code "P," "MC1" or "MC2" showing the control range, and "CS11" through "CS23" or "CS31" through "CS48" showing the node numbers of #11~#18, #21~#28 of the slave control sections 3 or #31~#38 and #41~#48 of the slave control sections 3 in the blocks BK11 through the BK28 or the blocks BK31 through BK48 that are control ranges, inserted between the start code "STX" and the end code "EXT" of the message, with a block check "BCC" following the text sentence, as shown in FIGS. 4 and 5, for example.

Upon receipt of the control range designating message, each slave control section 3 causes the slave network connecting section 31 thereof to return a response message, which is a slave declaration, to the master control section 1 or 2, which has transmitted its own node number, via the network line 5.

The response message comprises "ACK" showing that it is a response message, and its own node number showing the responded slave control section 3.

After designation of the master-slave control relations between the master control section 1 or 2 and each slave control section 3 has been completed, the rotary presses are operated under the synchronous control of each rotary press set.

Each input operation section 11 of the master control sections 1 and 2 is changed over to the operation signal input enable state, and an operation signal, such as start, acceleration/deceleration and stop, is entered from the input operation section 11.

When the operation signal is entered, the processing section 12 sets a speed value corresponding to the entered operation signal to the master pulse signal output section 14 of the master value setting section 13. With this, the master pulse signal output section 14 produces a first pulse signal corresponding to the set speed, and also produces a second pulse signal every time the first pulse signal is generated by a predetermined number. The first and second pulse signals are signals of a frequency equal to the pulse signal produced by the encoder 6 provided corresponding to each driving means and the Z-phase pulse signal produced by the encoder 6 when the rotary presses are caused to operate at the set speed.

As the master pulse signal output section 14 starts generating the aforementioned signals, the speed setting section 15 and the phase setting section 16 of the master value setting section 13 add up the pulse outputs produced by the master pulse signal output section 14. That is, the speed setting section 15 adds up the first pulse signals, and the accumulated results are cleared by the second pulse signals. The phase setting section 16 adds up the first and second pulse signals, and the accumulated value of the first pulse signals is cleared by the second pulse signals, and the accumulated value of the second pulse signals is cleared every time the accumulated value reaches a predetermined value.

The predetermined value at which the accumulated value of the second pulse signals is cleared is predetermined on the basis of the ratio between the revolution of the driven part and the revolution of the encoder 6. When the encoder 6 makes four turns for one turn of the driven part, for example, the predetermined number is "4," whereas the predetermined number is "1" when the encoder 6 makes one turn for one turn of the driven part. That is, the phase setting section 16 need not count the second pulse signals in the latter case.

The accumulated values of the speed setting section 15 and the phase setting section 16 are transmitted as a control message from the master network connecting section 17 to the slave control section 3 that is within the control range via the network line 5 at predetermined intervals of time, every 100 microseconds, for example.

The control message comprises a text sentence having a control code "P," "MC1" or "MC2" showing the control range, "V8" through "V5" showing the master speed values, and "V4" through "V1" showing the master phase values, inserted between the start code "STX" and the end code "EXT" of the message, with a block check "BCC" following the text sentence, as shown in FIGS. 6 and 7, for example. "V8" through V5" here use ASCII codes from "0" to "9" and "A" to "F." and both the master speed value and the master phase value in the message shown consist of four bytes, for example. Each master speed value and master phase value in the control range "MC1" and the control range "MC2" may differ from each other.

These messages are transmitted on the network line 5 at the rate of 20 megabit per second, for example.

Upon receipt of the control message, the master speed value is entered into the master speed output section 32 and the master phase value into the master phase output section 33 in each slave control section 3, and processed there.

That is, the processing section 12 in the master speed output section 32 into which the master speed value is entered obtains a value S1 proportional to the set speed value by calculating the following equation, and produces an analog signal corresponding to this value S1 as a master speed signal.

$$S1=(Y2-Y1)/T$$

where Y2 is the master speed value that has been entered this time, Y1 is the master speed value that was entered immediately before Y2, and T is a predetermined interval of time for the master control sections 1 and 2 to transmit the control message. When the accumulated value of the first pulse signals in the speed setting section 15 is reset by the second pulse signal, it may happen that Y1>Y2, and therefore S1<0. In such a case, S1 is obtained by calculating $$S1=(Ym+Y2-Y1)/T$$

where Ym is the number of outputs of the first pulses necessary for the second pulse signal is generated, and is a predetermined value.

The master phase output section 33 into which the master phase value has been entered generates the latest master phase value by replacing the immediately preceding phase value with the newly entered master phase value.

In addition, an output pulse signal of the encoder 6 connected to the driving means M corresponding to each slave control section 3 is entered into the slave control section 3 via the encoder pulse signal receiving section 38, and processed in the feedback phase output section 37 and the feedback speed output section 39.

That is, the feedback phase output section 37 adds up the pulse signals and Z-phase signals produced by the encoder 6, and outputs the accumulated value as a rotating phase value for the driving part. In the course of the integration in this feedback phase output section 37, the accumulated value of the pulse signals is cleared with the Z-phase pulse signal, the accumulated value of the Z-phase pulse signals is cleared every time the accumulated value reaches a predetermined number. The predetermined number at which the accumulated value of the Z-phase pulse signals is predetermined on the basis of the ratio between the revolution of the driven part and the revolution of the encoder 6, as in the case of clearing the accumulated value of the second pulse signals in the aforementioned phase setting section 16.

The feedback speed output section 39 adds up the pulse signals produced by the encoder 6, and obtains a value S2 proportional to the rotating speed of the driving means M every time the slave network connecting section 31 receives a control message by calculating the following equation:

$$S2=(Y4-Y3)/T$$

where Y4 is the accumulated value at that time, Y3 is the accumulated value when the control message immediately before it has been received, T is a predetermined time interval at which the control message is transmitted. The feedback speed output section 39 outputs an analog signal corresponding to the value S2 as a driving speed signal. When the accumulated value of the pulse signals in the feedback speed output section 39 is reset by the Z-phase pulse signal, it may happen that Y3>Y4, and therefore S2<0. In such a case, S2 is obtained by calculating $$S2=(Ym+Y4-Y3)/T$$

where Ym is the number of outputs of the encoder 6 during a period when the preceding and succeeding Z-phase pulse signals are generated, and is a predetermined value.

Furthermore, the drive power fed from the motor driver 41 to the driving means M is corrected in the slave control section 3 every time a control message is received by the slave network connecting section 31. The details are as follows:

The master phase output section 33 produces a master phase value, as described earlier, every time a control message is received by the slave network connecting section 31. This master phase value is entered into the phase difference detecting section 34. The rotating phase value of the driven part produced by the feedback phase output section 37 has been entered in the phase difference detecting section 34.

The phase difference detecting section 34 obtains the difference between the master phase value and the rotating phase value of the driven part, and outputs the difference value obtained to the proportional-plus-integer amplifier 35. With this, the proportional-plus-integer amplifier 35 generates an analog signal corresponding to the entered difference value as a phase difference output.

Every time a control message is received by the slave network connecting section 31, the master speed output section 32 generates a master speed output that is an analog signal proportional to the speed value set by the processing section 12, as described earlier, and the feedback speed output section 39 generates a drive speed signal that is an analog signal proportional to the rotating speed of the driving means M.

The aforementioned master speed signal is corrected by the phase difference signal in the first speed signal correcting section 36 into a first corrected speed signal, and then corrected by the drive speed signal in the second speed signal correcting section 40 into a second corrected speed signal. The second corrected speed signal is entered into the motor driver 41.

Upon receipt of the second corrected speed signal, the motor driver 41 corrects the drive power to be fed to the driving means M so as to match with the second corrected speed signal.

With the aforementioned control, the driven part of each block in each control range, that is, in each rotary press set is brought into synchronous operation in which the rotating phase and the rotating speed are matched with each other.

Although two sets are designated as control ranges separately by different master control section 1 and 2, the two sets can be designated as control ranges by either of the master control section 1 or 2, and the two sets can be individually brought into synchronous control by either of the master control section 1 or 2.

When the two sets are individually brought into synchronous control by either of the master control section 1 or 2, the input operation section 11 of the master control section 1, for example, enters set organization information in which synchronous control is carried out by combining the printing units CT1 and CT2 as a first set, and the printing units CT3 and CT4 as a second set.

With this, the processing section 12 of the master control section 1 transmits the control range designating message shown in FIGS. 4 and 5 to each slave control section 3 in the order of the message shown in FIG. 4 and the message shown in FIG. 5 via the master network connecting section 17 and the network line 5. In this transmission, the message shown in FIG. 5 is transmitted only after a response message from each slave control section 3 to the message shown in FIG. 4 has been received.

The processing section 12 of the master control section 1 secures the master value setting sections 13 corresponding to the two sets, that is, the two control ranges, and selectively changes over them from the input operation section 11 so that operation signals can be entered into each master value setting section 13. With this processing by the processing section 12, the two master value setting sections 13 of the master control section 1 can be selectively changed over to perform synchronous control similar to that described earlier.

The set organization of rotary printing presses is not limited to two sets. Needless to say, printing units forming each set can be organized in any combinations in accordance with the type of printed matter being produced and the state of printing units.

As described above, the present invention, in which the master control sections and the slave control sections are networked and at least two master control sections are provided on a network, makes it possible to put rotary presses into printing operation under synchronous control without being affected by changes in the number of pages of printed matter being produced or an individual breakdown of printing units. Should any of the master control sections fail, printing operation of the rotary presses under synchronous control can be maintained using a normal master control section that survives. This could eliminate the total shutdown of printing operation by rotary presses.

What is claimed is:

1. A network-type synchronous control system for rotary printing presses where driving means of printing sections and the driven parts thereof are combined into a block, a plurality of blocks are combined into a set, and several sets are controlled so that each set is brought into synchronous rotation, the improvement comprising

- at least two master control sections capable of individually controlling said sets organized into arbitrary combinations,
- slave control sections provided corresponding to each driving means of said printing units for controlling each block in the set upon receipt of control information from said master control sections, and
- a network line connecting said master control sections to said slave control sections;
- said master control section comprising a processing section for designating set organizations by combining a plurality of said blocks, an input operation section for entering information required to operate said organized sets, a master value setting section for setting a master phase and a master speed to control each set, and a master network connecting section for connecting to said network line;
- so that synchronous control of each set designated by said master control section is achieved individually.

2. A network-type synchronous control system for rotary printing presses as set forth in claim 1 wherein said master value setting section comprises a master pulse signal output section for generating a first master pulse signal and a second pulse signal every time a predetermined number of said first pulse signals have been generated, a speed setting section for setting a master speed on the basis of said first pulse signal, and a phase setting section for setting a master phase on the basis of said first pulse signal and said second pulse signal.

3. A network-type synchronous control system for rotary printing presses as set forth in claim 1 wherein said slave control section comprises a slave network connecting section for transmitting/receiving messages with said master control section and receiving drive references, a master phase output section for generating the master phase value for selected printing-unit driving means received by said slave network connecting section, a master speed output section for generating a master speed signal on the basis of the drive reference received by said slave network connecting section, an encoder pulse signal receiving section for receiving a feedback signal relating to the operating state of said printing units, a feedback speed output section for generating a drive speed signal relating to a feedback speed on the basis of the feedback signal received by said encoder pulse signal receiving section, a feedback phase output section for generating a rotating phase value relating to a feedback phase on the basis of the feedback signal received by said encoder pulse signal receiving section.

* * * * *